Jan. 30, 1951    H. E. KOEPCKE    2,539,913
SOLENOID-OPERATED VALVE
Filed June 3, 1948

*INVENTOR.*
HARRY E. KOEPCKE
BY Bruno C. Sechler
ATTORNEY

Patented Jan. 30, 1951

2,539,913

UNITED STATES PATENT OFFICE 2,539,913

SOLENOID-OPERATED VALVE

Harry E. Koepcke, East Moline, Ill., assignor to American Machine and Metals, Inc., New York, N. Y., a corporation of Delaware Application June 3, 1948, Serial No. 30,863

5 Claims. (Cl. 74—110)

This invention relates to improvements in solenoid-actuated mechanism for operating valves, and more especially to solenoid actuated mechanism intended for severe duty involving frequent valve operations and current flowing through the solenoid all the time that the valve is in one position.

It is an object of the invention to provide a mechanism which connects the movable stem of the valve proper with the core of the solenoid that is of a balanced symmetrical nature so as to prevent binding or other undesirable effects of unsymmetrical stress. In carrying out this principle of balanced transmission of movement from the solenoid core to the movable valve stem, I use two lever systems arranged symmetrically with respect to an axis passing through the solenoid core and the valve stem.

It is a well-known fact that the amount of current the coil of a solenoid draws depends on the position of the solenoid core relative to the solenoid coil and that, if the core is permitted to remain in a position other than the completely drawn-in position for any extended length of time while current flows through the coil, the current load and thereby the heating effect upon the solenoid coil may become excessive. Now, while by the use of the two symmetrical lever systems mentioned unsymmetrical stresses are avoided and thereby the valve disk or disks carried by the movable valve stem and their co-ordinated seats will undergo only a greatly diminished wear, some wearing of the valve disks and seats will nevertheless occur and this has to be compensated for, such as by allowing the valve stem to carry out a stroke of increased length. It is an object of the invention to provide a solenoid operated mechanism having movement transmitting means which include two symmetrically arranged lever systems and resilient means which participate bodily in the movement of the solenoid core until such time as the disc of a valve actuated by the mechanism arrives at its seat, but permit the core of the solenoid to reach its fully drawn-in position within the coil regardless of any change that may have occurred in the length of the stroke to be carried out by the valve disk, the movement of the core after the valve disk has seated being absorbed by said resilient means.

An object of the invention is to provide a solenoid-operating mechanism for a valve having the pair of lever systems above referred to, wherein force is transmitted from the solenoid core to each of the lever systems through an equalizing member so that to each of these two lever systems that proportion of the total force of the core is transmitted which is required to secure an equal bearing of both lever systems upon the part or parts of the movement transmitting means actuated by these lever systems.

The invention is applicable to the operation of two-way valves as well as to valves controlling more than one fluid passage. It is especially applicable to three-way valves intended for very severe duty such as, for instance, three-way valves serving to control the movement of the head of a garment press.

Other objects and features of the invention will appear as the description proceeds, reference being had to the accompanying drawings, which show, by way of example, one embodiment of the invention applied to the operation of a solenoid-operated three-way valve.

Figure 1:
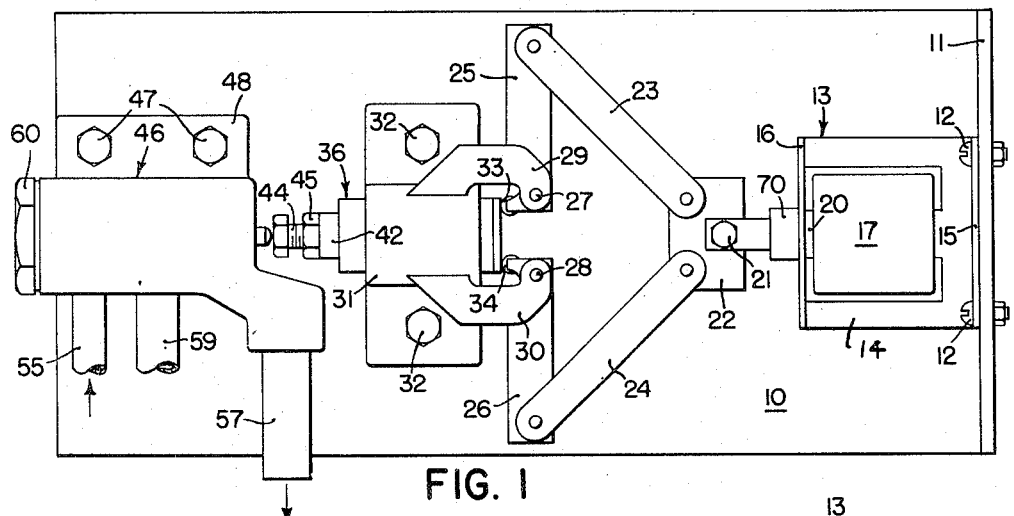
Fig. 1 is a top plan view of the entire valve assembly to which the invention has been applied.
Figure 2:
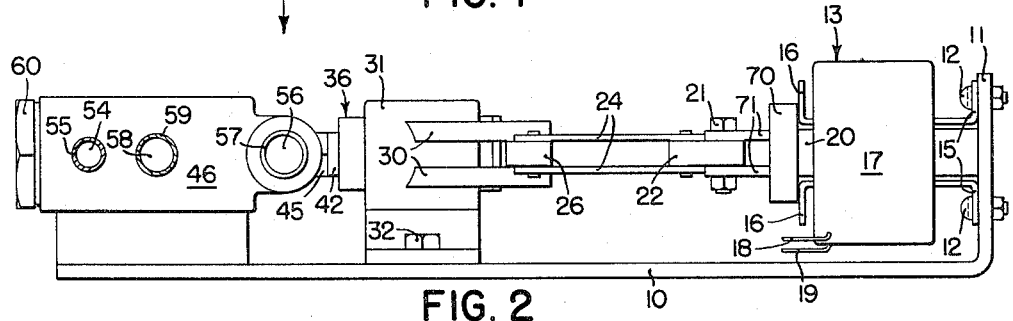
Fig. 2 is a side view to Fig. 1.

Attached to a vertically bent-up portion 11 of a base plate 10 by means of bolts 12 is a solenoid, generally indicated at 13. The solenoid 13 has a frame 14 comprising projecting flanges 15 and 16. Mounted on the frame 14 is a coil 17 having leads 18 and 19. Freely movable through the center of the frame 14 and the coil 17 is a core 20 having a head 70 which terminates at its rear side in a bifurcated member 71, to which there is attached by means of a bolt 21 an equalizer bar 22. A pair of links 23 connects one end of the equalizer bar 22 to a lever 25 and another pair of links 24 connects the other end of the bar 22 to a lever 26. The levers 25, 26 are pivoted at 27 and 28 on arms 29 and 30, respectively, these arms extending out from a casting 31 which is rigidly bolted to the base 10 by cap screws 32. Each of the levers 25, 26 carries at its inner end a roller 33, 34, respectively.

Slidably arranged in a bore 35 in the casting 31 is a capsule or cartridge generally indicated at 36, which comprises a cylindrical body 37 closed at the right end by a plug 38. The plug 38, which is attached to the cylindrical body 37 by means of a pin 39, provides a flat surface against which the two rollers 33, 34 may bear. The left end of the cylinder 37 is closed by a plunger 42 which is slidable in the cylinder and whose movement to the left is limited by means of a snap ring 40 seated in an internal groove 41 in the cylinder 37. A spring 43, precompressed between the plug 38 and the plunger 42, normally keeps the latter against the ring 40. Into the plunger 42 there is adjustably screwed a bolt 44 which, after the proper adjustment has been secured, may be locked by a nut 45.

Figure 3:
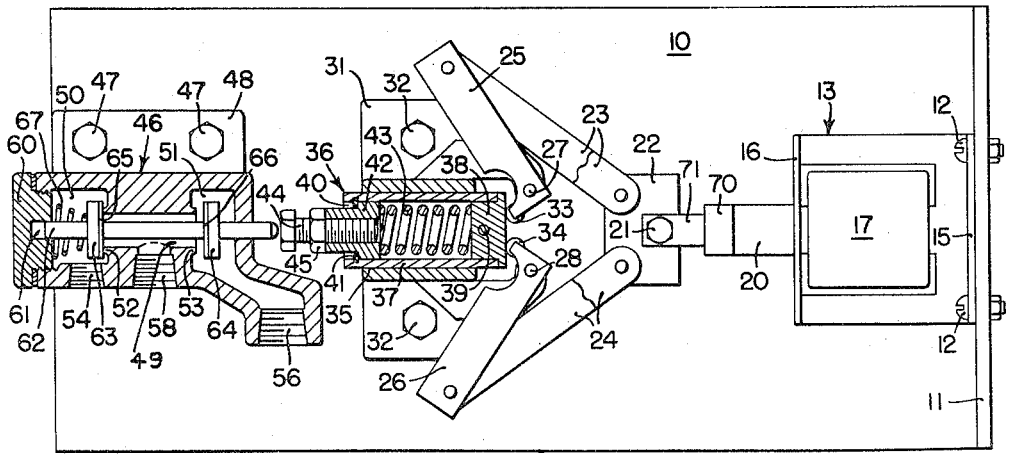
Fig. 3 is a plan view, partly in section, of the valve assembly shown in Figs. 1 and 2, the valve proper being in a position different from the one shown in Figs. 1 and 2.

A valve casing 46 is secured to the base 10 by means of cap screws 47 passing through a flange 48 of this casing 46. Within the casing 46 a central bore 49 is provided ending in enlarged recesses 50 and 51. A valve seat 52 is formed in recess 50 and a valve seat 53 in recess 51. 54 denotes a fluid inlet opening into which a pipe 55 is tapped for supplying fluid to the recess 50. The recess 51 connects with an outlet opening 56 through which the fluid may be exhausted into a pipe 57. The central portion of the bore 49 is open towards an opening 58 of the valve casing 46 into which a pipe 59 fits. The pipe 59 may lead to any device (not shown) to be actuated by the pressure fluid which is controlled by the three-way valve just being described. At its left side the valve casing 46 is closed by a screw plug 60 having at its inner side a central bore 61 into which the one end of a valve stem 62 extends. This valve stem carries two valve disks 63 and 64 and extends centrally through the bore 49 and through a hole drilled through the right end of the casing 46. The two valve disks 63 and 64 are each provided with a resilient facing 65 and 66, respectively. The disks 63 and 64 are so spaced on the valve stem 62 that, when the valve stem is moved endwise, either disk 63 may become seated upon its seat 52 or disk 64 upon its seat 53. A light coil spring 67 tends to keep the disk 63 seated and the disk 64 unseated and in this tendency the spring 67 is supported by the fluid pressure existing in the recess or space 50. As long as the two disks 63, 64 are in the just mentioned position, which is shown in Fig. 3, the pipe 59 is connected with the exhaust pipe 57, but when the valve stem 62 is pushed to the left, in a manner to be described presently, so as to seat the valve disk 64 and unseat the valve disk 63, the pipe 59 becomes connected with the fluid supply line 55, whereas its connection to the exhaust pipe 57 is broken.

For a proper function of the device the travel of the valve stem 62 in either direction must be such as to completely seat one of the two valve disks 63, 64. While the length of this travel is fixed at any particular time, there takes place a gradual change in this length for the reason that the resilient faces 65 and 66 carried by the valve disks 63 and 64 become gradually more and more compressed, so that the travel necessary for bringing one disk from the position which corresponds to the completely closed position of the respective other disk into its own completely closed position grows gradually longer. On the other hand, it is desirable that each time the coil 17 of the solenoid 13 is energized the core 20 of the solenoid be allowed to be fully drawn into the coil 17 in order to keep the current load on the coil at a minimum as has been mentioned before. As long as the amount of current flowing through the coil 17 is thus being kept low, the heating effect of the current upon the coil is relatively small and there is no danger of overheating of the coil. Now, since the core 20 is in the extended position shown in Fig. 3 while there is no current on the solenoid and the valve disk 63 is closed, this core must, upon the solenoid being placed under current, be moved from the position of Fig. 3 to that of Fig. 1. While during this travelling time of the core 20 the current through the coil 17 will have a relatively high value, it takes but a short time for the core to move from the position shown in Fig. 3 to that shown in Fig. 1. Consequently, the above mentioned low current flow obtains during the major part of the time the coil 17 is in use, always provided that the core 20, when it comes to rest under current load, has carried out a complete stroke, that is to say, has been drawn into the coil 17 completely. The construction described provides for such a complete stroke also under adverse conditions, such as when a connection anywhere in the several links and pins of the movement transmitting mechanism, or in any of the supports on the base 10, has become loose, or the compression and wear of the resilient facings 65 and 66 of the valve disks 63 and 64 has become rather severe. At the same time this construction assures that the completion of the stroke of the core 20 is accompanied by a complete closure of the seat 53 by the valve disk 64. The spring 43 which bears against the piston 42 is precompressed to a pressure which is sufficient to overcome the pressure of the fluid supplied to the space 50 through the pipe 55 as well as the pressure of the spring 67. Any pressure higher than the sum of the two pressures just mentioned will compress the spring 43. The screw 44 may be adjusted so that the valve disk 64 reaches its seat 53 slightly before the core 20 has completed its stroke. The further movement of the core 20 until the latter, under the continued action of the coil 17, reaches its innermost position within the coil 17, is absorbed in a further compression of the spring 43. Additionally thereto the spring 43 acts as a shock absorber preventing that the resilient facing 66 of the disk 64 lands upon its seat 53 in a hammerblow-like manner. As the core 20 is drawn in, it accelerates rapidly so that all of the parts of the movement transmitting mechanism, including the equalizer bar 22, the links 23, 24, the levers 25, 26 and the capsule 36, are moving at their maximum speed which, if the spring 43 were not present, would result in the transmission to the valve stem 62 of a blow far in excess of the normal pressure bearing upon the stem when the valve disk 64 is closed. Due to the spring 43 such hammering cannot occur.

It will be observed that on account of the interposition of the two lever systems 23, 25 and 24, 26 arranged symmetrically with respect to the common axis through the solenoid core 20, the cylinder 37 and the valve stem 62, the rollers 33 and 34 will bear symmetrically and simultaneously on the plug 38 forming the bottom of the cylinder 37, thus preventing binding. By the interlinkage of the solenoid core 20 with the links 23, 24 of the two symmetrical lever systems by means of the equalizer bar 22 it is assured that the two rollers 33, 34 will supply equal pressures to the capsule 36, regardless of wear or misalignment or inaccuracy of the parts. Since the valve casing 46, the support 31 for the capsule 36, as well as the frame 14 which carries the solenoid coil 17 are all mounted on a single common carrier 10, 11, any chances for misalignment are practically eliminated.

It has been found that the construction described will work very satisfactorily under heavy duty and that it is particularly well adapted for controlling the movement of the head of a garment press where the mechanism actuates the valve several times a minute throughout the working day and is expected to remain in adjustment for years.

While I have shown in the drawing one particular embodiment of the invention, I desire it to be understood that this embodiment has been given for the purpose of illustration only and that various changes and modifications may be made in the details of the construction shown without departing from the spirit of the invention or the scope of the appended claims.

What I claim is:

1. Mechanism adapted to transmit motion between a solenoid and valve plunger or the like to be actuated by said solenoid, comprising, in combination, a support, a solenoid mounted on said support, a valve-actuating bar free to slide in said support, two symmetrically arranged levers each having a short arm bearing against the end of said bar, fulcra for said levers on said support, an armature adapted to be attracted by said solenoid, an equalizing bar pivoted on said armature, connecting links joining the ends of said levers to the equalizing bar.

2. Mechanism adapted to transmit motion between a solenoid and valve plunger or the like to be actuated by said solenoid, comprising, in combination, a support, a solenoid mounted on said support, a valve-actuating hollow bar free to slide in said support, an axially movable rod projecting from the forward end of said bar, a pre-compressed spring inside said bar tending to hold said rod extended, two symmetrically arranged levers each having a short arm bearing against the rear end of said bar, fulcra for said levers on said support, an armature adapted to be attracted by said solenoid, an equalizing bar pivoted on said solenoid, connecting links joining the ends of said first-named levers to the equalizing bar.

3. Mechanism adapted to transmit motion between a solenoid and valve plunger or the like to be actuated by said solenoid, comprising, in combination, a support, a solenoid mounted on said support, a valve-actuating hollow bar free to slide in said support, an axially movable rod projecting from the forward end of the said bar, an axially movable adjustable extension of said rod, a pre-compressed spring inside said bar tending to hold said rod extended, two symmetrically arranged levers each having a short arm bearing against the rear end of said bar, fulcra for said levers on said support, an armature adapted to be attracted by said solenoid, an equalizing bar pivoted on said solenoid, connecting links joining the ends of said first-named levers to the equalizing bar.

4. Mechanism adapted to transmit motion between a solenoid and valve plunger or the like to be actuated by said solenoid, comprising, in combination, a support, a solenoid mounted on said support, a valve-actuating hollow bar free to slide in said support, two levers fulcrumed on said support, short arms of said levers making an acute angle with the axis of said bar when the longer arms extend in opposed direction, an armature adapted to be attracted by said solenoid, an equalizing bar pivoted on said solenoid, connecting links joining the ends of the longer arms of said first-named levers to the equalizing bar.

5. Mechanism adapted to transmit motion between a solenoid and a valve plunger or the like, comprising, in combination, a support, a solenoid mounted on the support, an axially movable armature for the solenoid, an equalizing bar carried by the solenoid, two pivot points on the support symmetrically placed on opposite sides of the axis of the solenoid, similar bell-crank levers mounted on each pivot so that both of their arms extend away from the solenoid, links connecting the long arms of each bell-crank lever to the equalizing bar, a bar mounted on a support free to slide in the axis prolonged of the solenoid, short arms on said bell-crank levers bearing against the end of said bar so that, as the armature is drawn home, the two longer arms of the lever extend more nearly in line with each other while the shorter arms are more nearly parallel to each other, thereby exerting on the bar the maximum pressure as the armature approaches its seat.

HARRY E. KOEPCKE.

REFERENCES CITED

The following references are of record in the file of this patent:

UNITED STATES PATENTS

| Number | Name | Date |
|---|---|---|
| 977,577 | Wikander | Dec. 6, 1910 |
| 1,819,461 | Frank | Aug. 18, 1931 |
| 2,080,067 | Stucatur | May 11, 1937 |